United States Patent
Davis

(10) Patent No.: US 9,127,604 B2
(45) Date of Patent: Sep. 8, 2015

(54) CONTROL SYSTEM AND METHOD FOR PREVENTING STOCHASTIC PRE-IGNITION IN AN ENGINE

(76) Inventor: Richard Stephen Davis, Lake Orion, MI (US)

(*) Notice: Subject to any disclaimer, the term of this patent is extended or adjusted under 35 U.S.C. 154(b) by 899 days.

(21) Appl. No.: 13/215,826

(22) Filed: Aug. 23, 2011

(65) Prior Publication Data

US 2013/0047956 A1 Feb. 28, 2013

(51) Int. Cl.
*F02D 37/02* (2006.01)
*F02D 41/00* (2006.01)
*F02P 5/152* (2006.01)
*F02D 41/14* (2006.01)

(52) U.S. Cl.
CPC ............ *F02D 41/0007* (2013.01); *F02D 37/02* (2013.01); *F02D 41/1497* (2013.01); *F02P 5/152* (2013.01); *F02D 41/1456* (2013.01); *F02D 2250/36* (2013.01); *Y02T 10/144* (2013.01); *Y02T 10/46* (2013.01)

(58) Field of Classification Search
CPC ....... F02D 41/30; F02D 2200/101; F02P 9/00
USPC .......................... 123/406.11–406.14, 406.16, 123/406.19–406.21, 406.27, 406.29, 123/406.34, 406.37–406.39; 701/104, 105, 701/111
See application file for complete search history.

(56) References Cited

U.S. PATENT DOCUMENTS

| | | | |
|---|---|---|---|
| 3,923,021 A | 12/1975 | Stark | |
| 4,233,943 A | 11/1980 | Rogora et al. | |
| 4,525,781 A | 6/1985 | Konomi et al. | |
| 4,587,938 A * | 5/1986 | Kobayashi et al. | 123/406.44 |
| 4,658,787 A | 4/1987 | Takizawa | |
| 4,691,677 A | 9/1987 | Hotate et al. | |
| 4,716,873 A * | 1/1988 | Takaba et al. | 123/406.34 |
| 4,730,587 A * | 3/1988 | Norota et al. | 123/306 |
| 4,760,825 A | 8/1988 | Morita | |
| 4,763,264 A | 8/1988 | Okuno et al. | |
| 4,788,942 A | 12/1988 | Pouring et al. | |
| 4,915,076 A | 4/1990 | Takizawa | |

(Continued)

FOREIGN PATENT DOCUMENTS

CN 1204003 A 1/1999
CN 101074634 A 11/2007

(Continued)

OTHER PUBLICATIONS

U.S. Appl. No. 12/799,753, filed Apr. 30, 2010, Amann et al.
U.S. Appl. No. 13/590,351, filed Aug. 21, 2012, Betz.
U.S. Appl. No. 13/590,369, filed Aug. 21, 2012, Betz.
U.S. Appl. No. 13/775,628, filed Feb. 25, 2013, Gwidt et al.
Chinese Search Report dated Sep. 27, 2012 for Chinese Application No. CN201110097845.3, (2 pages).

(Continued)

*Primary Examiner* — Thomas Moulis
*Assistant Examiner* — Joseph Dallo

(57) ABSTRACT

A control system for an engine includes a spark module and a fuel module. The spark module advances spark timing of a cylinder R degrees past a spark limit for N consecutive cylinder firing events, and retards spark timing of the cylinder past the spark limit for M consecutive cylinder firing events after the N consecutive cylinder firing events. The fuel module supplies a rich fuel-air charge to the cylinder for the M consecutive cylinder firing events. According to the system, R is a real number greater than zero, N and M are integers greater than zero, and the spark limit is a control value used to limit an amount of spark advance to prevent spark-knock. A method for controlling an engine is also provided.

20 Claims, 4 Drawing Sheets

(56) References Cited

U.S. PATENT DOCUMENTS

| | | | |
|---|---|---|---|
| 4,919,096 A | 4/1990 | Manaka et al. | |
| 5,005,547 A * | 4/1991 | Suga et al. | 123/406.26 |
| 5,046,468 A | 9/1991 | Erhard | |
| 5,074,810 A | 12/1991 | Hobbs et al. | |
| 5,107,813 A | 4/1992 | Inoue et al. | |
| 5,110,310 A | 5/1992 | Hobbs | |
| 5,229,945 A | 7/1993 | Demizu et al. | |
| 5,408,863 A | 4/1995 | Sawyers et al. | |
| 5,477,826 A | 12/1995 | Hara et al. | |
| 5,632,247 A | 5/1997 | Hashizume et al. | |
| 5,699,253 A | 12/1997 | Puskorius et al. | |
| 5,700,171 A | 12/1997 | Horton | |
| 5,715,794 A | 2/1998 | Nakamura et al. | |
| 5,732,382 A | 3/1998 | Puskorius et al. | |
| 5,751,147 A | 5/1998 | Nakata et al. | |
| 5,765,528 A | 6/1998 | Kamimaru | |
| 5,771,482 A | 6/1998 | Rizzoni | |
| 5,905,193 A | 5/1999 | Hashizume et al. | |
| 6,023,651 A | 2/2000 | Nakayama et al. | |
| 6,085,143 A | 7/2000 | Przymusinski et al. | |
| 6,109,986 A | 8/2000 | Gaynor et al. | |
| 6,415,656 B1 | 7/2002 | Bidner et al. | |
| 6,485,341 B1 | 11/2002 | Lanyi et al. | |
| 6,668,812 B2 | 12/2003 | Javaherian | |
| 6,672,282 B2 | 1/2004 | Harrison et al. | |
| 6,691,653 B2 | 2/2004 | Denz | |
| 6,752,009 B2 | 6/2004 | Minich et al. | |
| 6,757,606 B1 | 6/2004 | Gonring | |
| 6,758,179 B1 | 7/2004 | McKay et al. | |
| 6,866,024 B2 | 3/2005 | Rizzoni et al. | |
| 6,999,868 B2 | 2/2006 | Funke et al. | |
| 7,024,304 B2 | 4/2006 | Fukasawa et al. | |
| 7,047,125 B1 | 5/2006 | He et al. | |
| 7,047,924 B1 | 5/2006 | Waters et al. | |
| 7,063,057 B1 | 6/2006 | Waters et al. | |
| 7,117,080 B2 | 10/2006 | Sobel | |
| 7,133,766 B2 | 11/2006 | Kokubo | |
| 7,146,851 B2 | 12/2006 | Wakahara et al. | |
| 7,167,789 B1 * | 1/2007 | Froloff et al. | 701/101 |
| 7,178,503 B1 | 2/2007 | Brehob | |
| 7,197,916 B2 | 4/2007 | Matsumoto et al. | |
| 7,214,110 B1 | 5/2007 | Ehlers et al. | |
| 7,243,532 B2 | 7/2007 | Tsujimura et al. | |
| 7,246,583 B2 | 7/2007 | Cinpinski et al. | |
| 7,251,557 B2 | 7/2007 | Strom et al. | |
| 7,325,446 B1 | 2/2008 | Assaf et al. | |
| 7,353,803 B2 | 4/2008 | Mathews et al. | |
| 7,361,067 B1 | 4/2008 | Smedema | |
| 7,437,233 B2 | 10/2008 | Yasui et al. | |
| 7,444,236 B2 | 10/2008 | Wiles | |
| 7,451,739 B2 | 11/2008 | Yasui et al. | |
| 7,469,678 B2 * | 12/2008 | Ruiz | 123/406.11 |
| 7,500,470 B2 | 3/2009 | Buslepp et al. | |
| 7,526,943 B2 | 5/2009 | Cubr et al. | |
| 7,530,261 B2 | 5/2009 | Walters | |
| 7,607,415 B2 | 10/2009 | Mathews et al. | |
| 7,623,955 B1 | 11/2009 | Rackmil et al. | |
| 7,654,248 B2 | 2/2010 | Buslepp et al. | |
| 7,665,558 B2 | 2/2010 | Akimoto et al. | |
| 7,685,996 B2 | 3/2010 | Brehob | |
| 7,698,935 B2 | 4/2010 | Dibble et al. | |
| 7,784,443 B2 * | 8/2010 | Hitomi et al. | 123/406.47 |
| 7,861,689 B2 | 1/2011 | Haug et al. | |
| 7,877,174 B2 | 1/2011 | Walser et al. | |
| 7,918,212 B2 | 4/2011 | Verdejo et al. | |
| 8,027,782 B2 | 9/2011 | Assaf et al. | |
| 8,176,896 B2 | 5/2012 | Verdejo et al. | |
| 8,245,692 B2 | 8/2012 | Glugla et al. | |
| 8,251,043 B2 | 8/2012 | Smith | |
| 8,261,603 B2 | 9/2012 | Kondo et al. | |
| 8,307,808 B2 | 11/2012 | Kaiser et al. | |
| 8,387,384 B2 | 3/2013 | Quigley et al. | |
| 8,392,096 B2 | 3/2013 | Mathews et al. | |
| 8,478,511 B2 | 7/2013 | Hamama et al. | |
| 8,532,908 B2 | 9/2013 | Morgan et al. | |
| 8,612,124 B2 | 12/2013 | Verdejo et al. | |
| 2002/0157639 A1 | 10/2002 | Kidokoro et al. | |
| 2004/0153286 A1 | 8/2004 | Yamada | |
| 2004/0236496 A1 | 11/2004 | Sobel | |
| 2005/0039721 A1 * | 2/2005 | Truscott et al. | 123/406.22 |
| 2005/0056240 A1 * | 3/2005 | Sugiyama et al. | 123/78 E |
| 2005/0121005 A1 | 6/2005 | Edwards | |
| 2005/0204805 A1 | 9/2005 | Wakahara et al. | |
| 2006/0112933 A1 | 6/2006 | Yasui et al. | |
| 2006/0124107 A1 * | 6/2006 | Sauler et al. | 123/406.29 |
| 2006/0241848 A1 * | 10/2006 | Strom et al. | 701/105 |
| 2006/0254560 A1 | 11/2006 | Mann et al. | |
| 2006/0293827 A1 | 12/2006 | Frauenkron et al. | |
| 2007/0068474 A1 | 3/2007 | Cinpinski et al. | |
| 2007/0119391 A1 * | 5/2007 | Fried et al. | 123/25 A |
| 2007/0233430 A1 | 10/2007 | Singh | |
| 2007/0239343 A1 | 10/2007 | Okubo et al. | |
| 2007/0295290 A1 | 12/2007 | Cao | |
| 2008/0006244 A1 | 1/2008 | Asano et al. | |
| 2008/0028387 A1 | 1/2008 | Nakagawa et al. | |
| 2008/0077307 A1 | 3/2008 | Wiles | |
| 2008/0178844 A1 | 7/2008 | Naegele et al. | |
| 2008/0183367 A1 * | 7/2008 | Kapus et al. | 701/103 |
| 2008/0283025 A1 * | 11/2008 | Sato | 123/406.45 |
| 2008/0312810 A1 * | 12/2008 | Nonoyama | 701/111 |
| 2009/0048729 A1 | 2/2009 | Waters et al. | |
| 2009/0090106 A1 | 4/2009 | Muller | |
| 2009/0192693 A1 | 7/2009 | Bottcher et al. | |
| 2009/0215331 A1 | 8/2009 | Suzuki et al. | |
| 2009/0223495 A1 | 9/2009 | Ohata et al. | |
| 2009/0229568 A1 | 9/2009 | Nakagawa | |
| 2009/0276142 A1 | 11/2009 | Leone et al. | |
| 2009/0276143 A1 | 11/2009 | Rackmil et al. | |
| 2009/0276147 A1 * | 11/2009 | Hamama et al. | 701/111 |
| 2010/0012079 A1 * | 1/2010 | Nakazono et al. | 123/295 |
| 2010/0037859 A1 * | 2/2010 | Mashiki | 123/406.33 |
| 2010/0063712 A1 * | 3/2010 | Bromberg et al. | 701/111 |
| 2010/0083936 A1 | 4/2010 | Verdejo et al. | |
| 2010/0088010 A1 | 4/2010 | Verdejo et al. | |
| 2010/0089361 A1 | 4/2010 | Inada et al. | |
| 2010/0094528 A1 | 4/2010 | Auclair et al. | |
| 2010/0152990 A1 | 6/2010 | Bjernetun et al. | |
| 2010/0152991 A1 | 6/2010 | Suzuki | |
| 2010/0192905 A1 * | 8/2010 | Lewis et al. | 123/299 |
| 2010/0294027 A1 * | 11/2010 | Kondo et al. | 73/114.02 |
| 2011/0067396 A1 | 3/2011 | Quigley et al. | |
| 2011/0139120 A1 | 6/2011 | Rollinger et al. | |
| 2011/0224882 A1 | 9/2011 | Makino et al. | |
| 2011/0246049 A1 | 10/2011 | Matsuo et al. | |
| 2011/0253100 A1 | 10/2011 | Kaiser et al. | |
| 2011/0265761 A1 | 11/2011 | Amann et al. | |
| 2011/0283972 A1 | 11/2011 | Wermuth et al. | |
| 2012/0048234 A1 | 3/2012 | Hamama et al. | |
| 2012/0078485 A1 | 3/2012 | Verdejo et al. | |
| 2012/0191275 A1 | 7/2012 | Clever et al. | |
| 2012/0191276 A1 | 7/2012 | Clever et al. | |
| 2012/0191277 A1 | 7/2012 | Clever et al. | |
| 2012/0209494 A1 | 8/2012 | Verdejo et al. | |
| 2013/0054109 A1 | 2/2013 | Buslepp et al. | |

FOREIGN PATENT DOCUMENTS

| | | |
|---|---|---|
| CN | 101331305 A | 12/2008 |
| DE | 102009008247 B3 | 8/2010 |
| JP | 2009174397 A | 8/2009 |
| JP | 2009275663 A | 11/2009 |

OTHER PUBLICATIONS

O'Reilly Auto Parts; Possible Cause of Engine Misfire: http://oreillyauto.com/site/app/newsfeed/detail?article=800649141; Nov. 23, 2011.

Tim Gilles; Automobile Service; Inspection, Maintenance, and Repair; Jun. 12, 2003; Delmar Learning; Second Edition; p. 560.

* cited by examiner

CONTROL SYSTEM AND METHOD FOR PREVENTING STOCHASTIC PRE-IGNITION IN AN ENGINE

FIELD

The present disclosure relates to engine control systems and methods for vehicles and, more particularly, to engine control systems and methods for preventing stochastic pre-ignition.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicles include a powertrain that generates drive torque used to propel the vehicle. Typically, the powertrain includes an internal combustion engine. Reciprocating-type engines produce torque by combusting an air and fuel (A/F) mixture or fuel-air charge in cylinders to drive pistons between a top-dead-center (TDC) position and a bottom-dead-center (BDC) position. Reciprocation of the pistons between the TDC and BDC positions drives rotation of a crankshaft, which produces the drive torque. At the TDC position, a volume of the combustion chamber is at its smallest volume. At the BDC position, the volume of the combustion chamber is at its largest volume.

Combustion occurs in combustion chambers defined by the cylinders and the pistons. In spark-ignition (SI) engines, combustion is initiated by an electrical discharge or spark that supplies energy to the fuel-air charge. Once initiated, combustion continues along a flame front for a period during which the piston is driven towards the BDC position. Generally, combustion timing is controlled and the flame front grows in a predictable and controlled manner and consumes nearly all of the fuel in the fuel-air charge. Combustion timing may be controlled by controlling spark timing, which may be specified relative to the TDC position. Spark advance generally refers to spark timing that occurs before the TDC position. Spark retard generally refers to spark timing that occurs after the TDC position.

Abnormal combustion is a term that is generally used to refer to a combustion process in which a flame front may be started by hot combustion chamber surfaces either prior to or after spark ignition, or a process in which a portion or all of the fuel-air charge may be consumed at abnormally high rates. Abnormal combustion phenomena include partial burning, misfire, knock, and pre-ignition. Knock is a term that is used to generally refer to an abnormal combustion process during which a portion of an end gas outside of the propagating flame front spontaneously ignites. Spontaneous ignition of the end gas, which includes the fuel, air, and residual gas mixture ahead of the propagating flame front, causes a rapid increase in local pressures and propagation of pressure waves of substantial amplitude across the combustion chamber. Knock is also used to refer to an audible noise that is generated by the pressure waves.

Pre-ignition is a term that generally refers to an abnormal combustion process in which the fuel-air charge is ignited by a source other than the electrical discharge provided by a spark plug. If the ignition occurs after the spark ignition, it is generally referred to as post-ignition. Following ignition, a turbulent flame develops at each ignition location and propagates in a manner similar to that occurring after spark ignition.

One type of pre-ignition is referred to as surface ignition, which generally refers to an abnormal combustion process in which a hot spot on the combustion chamber walls ignites the fuel-air charge prior to the arrival of the normal flame front. Hot spots may be created by an overheated valve or spark plug, combustion chamber deposit, or other energy source other than the spark. Surface ignition is often associated with what may be referred to as a "run away" phenomenon in which the pre-ignition occurs progressively earlier during successive engine cycles.

Another type of pre-ignition is referred to as stochastic pre-ignition. Stochastic pre-ignition may also be referred to as low-speed pre-ignition, since it generally occurs at relatively low engine speeds. Stochastic pre-ignition is generally associated with boosted engines such as turbocharged or supercharged engines. Stochastic pre-ignition typically occurs more randomly than other abnormal combustion processes and does not exhibit the typical run-away phenomenon characteristic of surface ignition.

Control systems have been developed to control combustion in an engine. In some conventional combustion control systems, spark timing is maintained below a spark limit or threshold to prevent an occurrence of knock and/or is retarded during corrective action to end or reduce an intensity of an occurrence of knock. However, these combustion control systems may not prevent or reduce an occurrence of pre-ignition.

SUMMARY

In one form, the present disclosure provides a control system for an engine that includes a spark module and a fuel module. The spark module advances spark timing of a cylinder R degrees past a spark limit for N consecutive cylinder firing events, and retards spark timing of the cylinder past the spark limit for M consecutive cylinder firing events after the N consecutive cylinder firing events. The fuel module supplies a rich fuel-air charge to the cylinder for the M consecutive cylinder firing events. According to the system, R is a real number greater than zero, N and M are integers greater than zero, and the spark limit is a control value used to limit an amount of spark advance to prevent spark-knock. In various features, a fuel-air equivalence ratio of the fuel-air charge is greater than 1.0 and less than 1.5. In other features, N is an integer greater than zero and less than three and M is an integer greater than zero and less than twenty. In still other features, the engine is one of a turbocharged engine and a supercharged engine.

In further features, the control system further includes an initiation module. The initiation module determines when an engine speed is within a predetermined range. In a related feature, the spark module advances spark timing for a first one of the N consecutive cylinder firing events when the engine speed is within the predetermined range. In still further features, the initiation module determines when at least one of the following criteria is met: (i) an engine torque is within a predetermined first range, and (ii) a boost pressure is within a predetermined second range. In a related feature, the spark module advances spark timing for a first one of the N consecutive cylinder firing events when the at least one of the criteria is met.

In various other features, the control system further includes a detection module that detects when a stochastic pre-ignition event occurs in the cylinder. In a related feature, the fuel module supplies a rich fuel-air charge to the cylinder for P consecutive cylinder firing events when the stochastic pre-ignition event is detected, P being an integer greater than zero.

In various other features, the M consecutive cylinder firing events begin on a next cylinder firing event of the cylinder after the N consecutive cylinder firing events. In still other features, the spark module advances spark timing R degrees past the spark limit for another N consecutive cylinder firing events for each of a plurality of remaining cylinders, one cylinder at a time. In a related feature, the fuel module supplies another rich fuel-air charge for another M consecutive cylinder firing events after the N consecutive cylinder firing events for each of the plurality of remaining cylinders, one cylinder at a time.

In another form, the present disclosure provides a method for controlling an engine. The method includes: (a) advancing spark timing of a cylinder R degrees past a spark limit for N consecutive cylinder firing events, (b) retarding spark timing of the cylinder past the spark limit for M consecutive cylinder firing events after the N consecutive cylinder firing events, and (c) supplying a rich fuel-air charge to the cylinder for the M consecutive cylinder firing events. According to the method, R is a real number greater than zero, N and M are integers greater than zero, and the spark limit is a control value used to limit an amount of spark advance to prevent spark-knock. In various features, a fuel-air equivalence ratio of the fuel-air charge is greater than 1.0 and less than 1.5. In other features, N is an integer greater than zero and less than three and M is an integer greater than zero and less than twenty. In still other features, the engine is one of a turbocharged engine and a supercharged engine.

In further features, the method further includes: (a) determining when an engine speed is within a predetermined range, and (b) advancing spark timing of the cylinder for a first one of the N consecutive cylinder firing events when the engine speed is within the predetermined range. In still further features, the method further includes: (a) determining when at least one of the following criteria is met: (i) an engine torque is within a predetermined first range, and (ii) a boost pressure is within a predetermined second range, and (b) advancing spark timing of the cylinder for a first one of the N consecutive cylinder firing events when the at least one of the criteria is met. In yet further features, the method further includes: (a) detecting when a stochastic pre-ignition event occurs in the cylinder, and (b) supplying a rich fuel-air charge to the cylinder for P consecutive cylinder firing events when the stochastic pre-ignition event is detected, P being an integer greater than zero.

In various other features, the M consecutive cylinder firing events begin on a next cylinder firing event of the cylinder after the N consecutive cylinder firing events. In still other features, the method further includes: (a) advancing spark timing R degrees past the spark limit for another N consecutive cylinder firing events for each of a plurality of remaining cylinders, one cylinder at a time, and (b) supplying another rich fuel-air charge for another M consecutive cylinder firing events after the N consecutive cylinder firing events for each of the plurality of remaining cylinders, one cylinder at a time.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
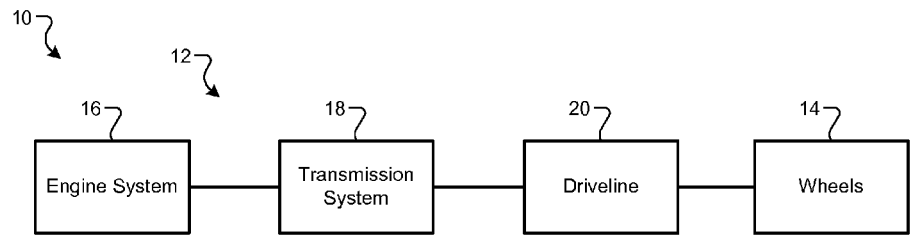
FIG. 1 is a functional block diagram illustrating an exemplary vehicle system for a vehicle according to the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Pre-ignition phenomena may be either deterministic or non-deterministic (i.e., stochastic). Deterministic pre-ignition is referred to by some in the art as classic, hot spot pre-ignition, and generally refers to pre-ignition events in which combustion proceeds in substantially the same manner from a given starting condition or initial state. Put another way, deterministic pre-ignition generally refers to non-random pre-ignition. In contrast, stochastic pre-ignition (SPI) generally refers to pre-ignition events in which combustion proceeds differently based on at least one random element.

Observations of SPI events indicate that SPI occurs as random, non-run-away pre-ignition events. Observations of SPI events further indicate that SPI may occur more frequently in boosted engines such as turbocharged engines and supercharged engines where brake mean effective pressures of twenty bars or more are achieved. SPI is predominantly a low-speed phenomenon and generally occurs at engine speeds within a range of a lowest speed at which a peak torque is generated, for example, between around fifteen hundred and two thousand revolutions per minute. However, SPI may also occur at higher engine speeds at a reduced frequency.

Typically SPI occurs at very low frequencies of around one event in several thousand engine cycles (i.e., hundredths of a percent). However, SPI events may be relatively severe, especially in boosted engines. For example, SPI can cause peak cylinder pressures to be up to two or more times higher than nominal peak pressures (e.g., 200 bar or more) and pressures at which the engine components are generally designed to tolerate. Excessive peak pressures may occur due to several factors. For example, in a highly boosted operating condition, there is more energy available in the cylinder than in a naturally aspirated engine condition. Base combustion phasing is more retarded in the highly boosted operating condition, and over-advanced phasing on SPI cycles may lead to the excessive peak cylinder pressures. Engine damage, typically piston damage, may occur due to relatively few SPI events.

SPI may ultimately occur as a result of interactions between various operating parameters including cylinder temperature, cylinder pressure, fuel-air equivalence ratio, and fuel-air charge chemistry. However, the precise interactions are not yet well understood. In one theory, liquid fuel impinges on the walls of the combustion chamber and mixes with lubricant oil present on the walls to create a fuel-oil mixture. Fuel-oil mixtures accumulate on the combustion chamber walls and in crevices such as a piston top land crevice, head gasket crevice, and/or similar crevices. When the accumulation reaches a threshold level, a portion of the mixture may reach combustion gases and become a source of a pre-ignition event. The pre-ignition event may result in advanced combustion phasing that leads to high peak cylinder pressures and, frequently, high amplitude knock. Additionally, air flow may move or transport the fuel-oil mixture from relatively cold combustion chamber walls of the crevices to relatively hotter walls located near the center of the combustion chamber, creating a gaseous hot spot where surface ignition can occur. Subsequently, when both the transport phenomena and the temperature distribution phenomena exceed threshold levels, an SPI event may occur.

Variability in the transport phenomena and the temperature distribution phenomena may cause the sporadic or random nature of SPI. Observations have further shown that for several firing events after an initial SPI event, a number of fuel-oil mixture droplets and/or dislodged soot deposits may remain in the chamber and can become a source of additional pre-ignition events. This phenomenon may explain a tendency of SPI events to occur in clusters of alternating cycle behavior.

The present disclosure provides a control system and method that can reduce the occurrence of SPI in an engine. The control system selectively executes a preventative SPI process to prevent SPI that may otherwise periodically occur. The control system further selectively executes a reactive SPI process when an SPI event is detected to inhibit additional SPI events that may otherwise occur as a result of the detected SPI event. The preventative SPI process is periodically executed under engine operating conditions in which SPI would typically occur and spark-knock can be initiated in a controlled manner. During a first period of the preventative SPI process, a spark module advances a spark timing of a cylinder past a spark threshold for a predetermined number of consecutive cylinder firing events. At an end of the first period, a fuel module supplies a rich NF mixture to the cylinder for a next predetermined number of consecutive cylinder firing events. By advancing the spark timing, the spark module induces spark-knock that dislodges any fuel-oil deposits and/or soot deposits that are present in the cylinder prior to their accumulating to a threshold level. By subsequently supplying a rich fuel-air charge for one or more cylinder firing events, the fuel module suppresses SPI of any remaining dislodged fuel-oil deposits until they are cleared from the combustion chamber. Observations indicate that enrichment may reduce the probability of SPI occurring due to a reduction in charge temperature from increased heat of vaporization.

With particular reference to FIG. 1, a functional block diagram illustrates an exemplary vehicle system 10 for a vehicle according to the present disclosure. The vehicle system 10 includes a powertrain 12 that drives one or more wheels 14 of the vehicle. The powertrain 12 includes an engine system 16, a transmission system 18, and a driveline 20. The engine system 16 produces drive torque that is transmitted to the transmission system 18. The transmission system 18 receives the drive torque output by the engine system 16 and transmits the drive torque to the driveline 20 at one of multiple gear ratios. The driveline 20 couples the transmission system 18 to the driven wheels 14. The present disclosure is not limited to conventional powertrains or hybrid powertrains. The present disclosure is also not limited to powertrains of a particular layout or drivelines of a particular type. For example, the powertrain 12 may have a front-wheel-drive layout, rear-wheel-drive layout, or an all-wheel drive layout. The present disclosure is also not limited to transmission systems of a particular type. For example, the transmission system 18 may include an automatic transmission or a manual transmission, or a continuously variable drive ratio transmission (CVT).

Figure 2:
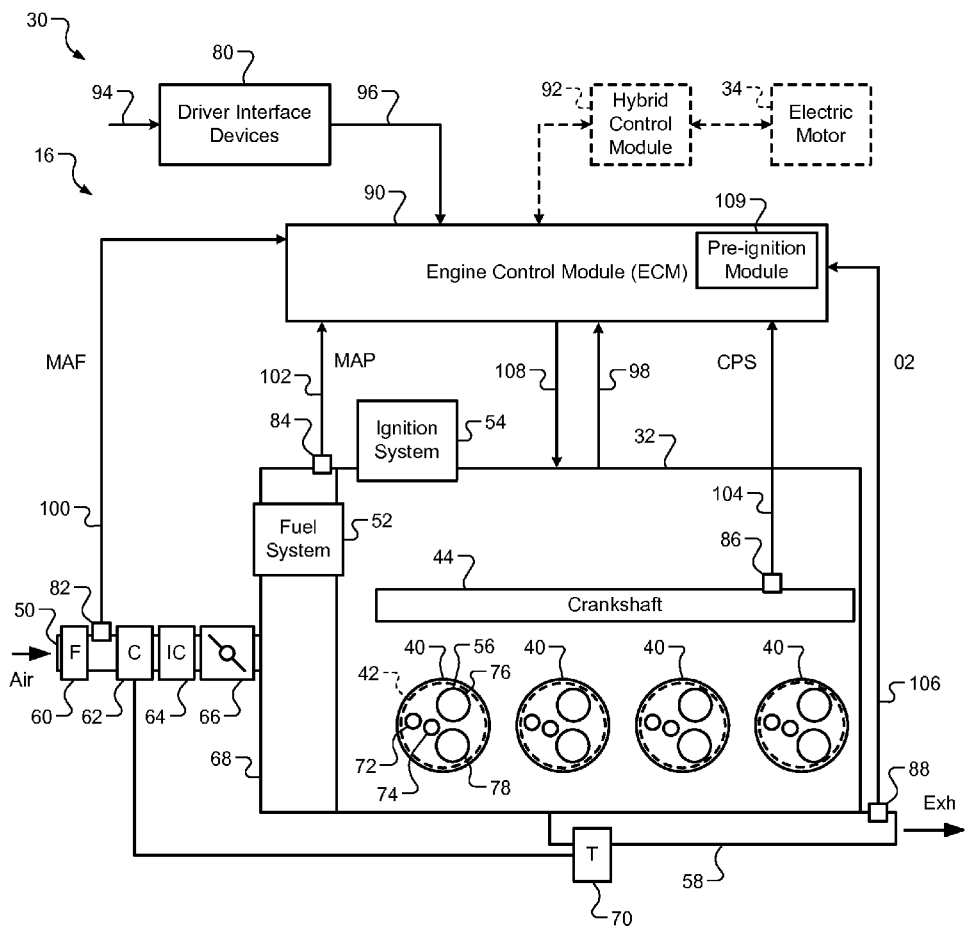
FIG. 2 is a functional block diagram illustrating an exemplary engine system and engine control system according to the present disclosure.

With particular reference to FIG. 2, a functional block diagram illustrates an exemplary implementation of the engine system 16 in an engine control system 30 according to the present disclosure. The engine system 16 includes an internal combustion engine (ICE) 32 that produces drive torque used to propel the vehicle. In various implementations, the engine system 16 may be a hybrid engine system that includes an electric motor 34 that produces drive torque used alone or in combination with torque produced by the ICE 32 to propel the vehicle. The ICE 32 is a reciprocating-type spark-ignition (SI) engine that combusts a fuel-air charge in one or more cylinders. The present disclosure is not limited to SI engines of a particular configuration. For example, the ICE 32 may have a V-type configuration or an in-line configuration. The ICE 32 may be a normally-aspirated engine or a boosted engine. For exemplary purposes, the ICE 32 is presented as a boosted engine including four cylinders 40 arranged in an in-line configuration. Pistons 42 reciprocate within the cylinders 40 and drive rotation of a crankshaft 44. While four cylinders 40 are presented, it will be appreciated that the ICE 32 may have fewer or additional cylinders.

The ICE 32 includes an intake system 50, a fuel system 52, an ignition system 54, a valve train 56, and an exhaust system 58. The intake system 50 controls a mass air flow (MAF) of air entering the ICE 32 and distributes the air to the cylinders 40.

The intake system 50 may include an air filter 60, a compressor 62, a charge air cooler or intercooler 64, a throttle 66, and an intake manifold 68. The air filter 60 filters the intake air. The compressor 62 receives the filtered air and compresses the filtered air, providing a compressed air charge to the intercooler 64. In various implementations, the compressor 62 may be part of a supercharger or a turbocharger. As a supercharger compressor, the compressor 62 may be driven by the crankshaft 44 via a belt or chain drive, for example.

For exemplary purposes, the compressor 62 is presented as a turbocharger compressor and is rotationally driven by a turbine 70 disposed within the exhaust system 58. The turbine 70 is rotationally driven by a flow of exhaust. The flow of exhaust provided to the turbine may be controlled by a waste gate (not shown). In this way, the waste gate may control an amount of boost provided by the compressor 62, or boost pressure. The compression of the air generates heat that increases the temperature of the compressed air charge above the temperature of the intake air. The compressed air charge may also receive heat from other heat sources, such as exhaust. The intercooler 64 cools the compressed air charge and provides a cooled compressed air charge to the throttle 66. The throttle 66 controls a flow rate of the cooled compressed air charge to the intake manifold 68. The intake manifold 68 distributes the air to the cylinders 40.

The fuel system 52 supplies fuel to the ICE 32. The fuel system 52 may include a fuel tank assembly (not shown) that supplies the fuel under pressure to one or more fuel injectors that control an amount of fuel supplied to the ICE 32. In various implementations, such as central point injection and multi-point injection implementations, the fuel injectors may inject fuel into the intake system 50 upstream of the cylinders 40. In alternate direct-injection implementations, the fuel injectors may inject fuel directly into the cylinders 40. For exemplary purposes, the ICE 32 is presented as having a direct-injection system including a fuel injector 72 extending within each of the cylinders 40.

The ignition system 54 supplies energy that initiates combustion within the cylinders 40 in the form of a spark. The ignition system 54 includes one or more spark plugs 74 extending within the cylinders 40 that supply the spark. The valve train 56 controls the flow of air into the cylinders 40 and exhaust out of the cylinders 40. The valve train 56 includes intake valves 76 and the exhaust valves 78. One or more intake valves 76 and exhaust valves 78 may be provided for each of the cylinders 40.

The intake valves 76 are moveable between closed positions and open positions. In the closed positions, the intake valves 76 close the cylinders 40 to the intake system 50 and thereby inhibit fluid communication. In the open positions, the intake valves 76 open the cylinders 40 to the intake system 50 and thereby enable fluid communication. The exhaust valves 78 are moveable between closed positions and open positions. In the closed positions, the exhaust valves 78 close the cylinders 40 to the exhaust system 58 and thereby inhibit fluid communication. In the open positions, the exhaust valves 78 open the cylinders 40 to the exhaust system 58 and thereby enable fluid communication.

During operating of the ICE 32, intake air is drawn into the cylinders 40 through the intake system 50 by the pistons 42 and mixes with fuel supplied by the fuel injectors 72 to create fuel-air charges. Air entering the ICE 32 may encounter the components of the intake system 50 in the following order: first, the air filter 60; second, the compressor 62; third, the intercooler 64; fourth, the throttle 66, and fifth, the intake manifold 68. The fuel-air charges are compressed by the pistons 42 and subsequently ignited by the spark provided by the spark plugs 74. Combustion of the NF mixtures drives the pistons 42, which in turn drive the crankshaft 44 and thereby produce the drive torque. Exhaust produced by the combustion is forced out of the cylinders 40 by the pistons 42 into the exhaust system 58. The exhaust system 58 receives exhaust from the cylinders 40 and treats the exhaust before expelling the exhaust into the surroundings.

The engine control system 30 includes driver interface devices 80 and sensors that sense or measure various engine operating parameters according to the present disclosure. For exemplary purposes, the sensors include a MAF sensor 82, a manifold absolute pressure (MAP) sensor 84, a crankshaft position (CP) sensor 86, and an oxygen (O2) sensor 88. The engine control system 30 further includes an engine control module (ECM) 90. In various hybrid implementations, the engine control system 30 may further include a hybrid control module 92 that controls operation of the electric motor 34 in cooperation with the ECM 90.

The driver interface devices 80 include various devices manipulated by a driver of the vehicle. For example, the driver interface devices 80 may include an accelerator pedal manipulated by the driver to convey a desired drive torque and a transmission range selector or tap gear switches manipulated by the driver to convey a desired range or gear ratio of the transmission system 18. The driver interface devices 80 may further include a brake pedal, a steering wheel, switches, and the like. The driver interface devices 80 receive driver inputs 94 and generate driver signals 96 based on the driver inputs 94.

The MAF sensor 82 senses a MAF of intake air entering the ICE 32 and may be disposed in the intake system 50 between the air filter 60 and the compressor 62. The MAF sensor 82 generates a MAF signal 100 indicative of the MAF sensed. The MAP sensor 84 extends within the intake manifold 68 and senses a pressure of the air within the intake manifold 68. The MAP sensor 84 generates a MAP signal 102 indicative of the MAP sensed. The CP sensor 86 senses a rotational position of the crankshaft 44, or crankshaft position, and generates a crankshaft position (CP) signal 104 indicative of the crankshaft position sensed. The O2 sensor 88 extends within the exhaust system 58 and senses oxygen content within the exhaust. The O2 sensor generates an O2 signal 106 indicative of the oxygen content sensed.

The ECM 90 controls operation of the ICE 32 by controlling various engine operating parameters including, but not limited to, MAF rate, fuel rate (i.e., fueling), fuel-air equivalence ratio, spark timing, and boost pressure. The ECM 90 controls the operation based on various inputs, the driver signals 96, the sensor signals, and other vehicle system signals 98. The ECM 90 controls the various engine operating parameters by generating control signals 108 based on the various inputs that are output to the various components of the ICE 32. For example, MAF may be controlled by a throttle control signal output to the throttle 66 and a waste gate control signal output to the turbine 70. Fueling may be controlled by a fuel control signal output to the fuel system 52 and, more particularly, injector signals output to the fuel injectors 72. Spark timing may be controlled by a spark control signal output to the ignition system 54 and, more particularly, by spark control signals output to the spark plugs 74. The control signals 108 may be timed control signals synchronized, for example, to a clock signal or crankshaft position.

Figure 3:
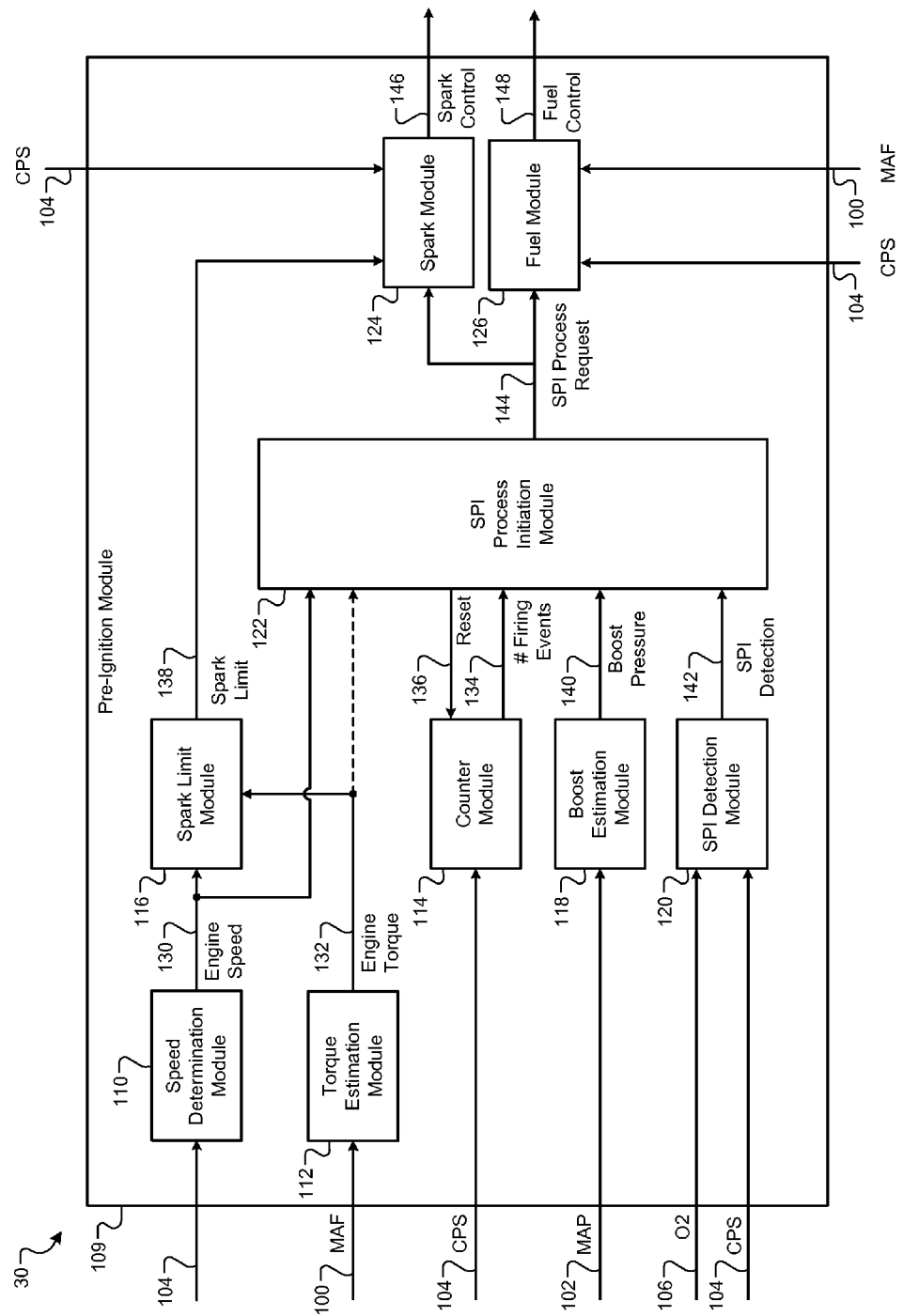
FIG. 3 is a functional block diagram illustrating an exemplary pre-ignition module according to the present disclosure.

The ECM 90 includes a pre-ignition module 109 that implements control of the ICE 32 according to the present disclosure. More specifically, the pre-ignition module 109 selectively executes a preventative SPI process and a reactive SPI process according to the present disclosure. With particular reference to FIG. 3, a functional block diagram illustrates an exemplary implementation of the pre-ignition module 109 according to the present disclosure. The pre-ignition module 109 includes a speed determination module 110, a torque estimation module 112, a counter module 114, a spark limit module 116, and a boost estimation module 118. The pre-ignition module 109 further includes an SPI detection module 120, an SPI process initiation module 122, a spark module 124, and a fuel module 126.

The speed determination module 110 periodically determines a rotational speed of the ICE 32, or engine speed, and outputs an engine speed signal 130 indicative of a current engine speed. The speed determination module 110 receives the CP signal 104 and determines the current engine speed based on the signal received.

The torque estimation module 112 periodically estimates the torque output of the ICE 32, or engine torque, and outputs an engine torque signal 132 indicative of a current engine torque. The engine torque may be determined according to various methods based on one or more engine operating parameters including, but not limited to, engine speed, MAF, fuel-air equivalence ratio, intake and exhaust valve timing, and spark timing. According to the present example, the torque estimation module 112 determines the current engine torque based on MAF. Accordingly, the torque estimation module 112 receives the MAF signal 100 and determines the current engine torque based on the signal received.

The counter module 114 periodically determines a period of engine operation since a last SPI process ended and outputs a counter signal 134 indicative of the period determined. The period may be measured by a number of engine cycles, or rotations of the crankshaft. According to the present example, an engine cycle may be completed every two rotations of the crankshaft 44, or every seven hundred and twenty (720) degrees of crankshaft rotation. Alternately or additionally, the period may be measured by a number of cylinder firing events. As used herein, the term cylinder firing event generally refers to a combustion event that occurs during a single combustion stroke of a piston. The number of cylinder firing events may be determined on a cylinder-by-cylinder basis (i.e., separately for each of the cylinders 40) to account for differences between the cylinders 40. The number of cylinder firing events may differ by cylinder, for example, in engine control systems that deactivate one or more cylinders by halting the provision of fuel during one or more engine cycles to improve fuel efficiency. The number of cylinder firing events may be based on a number of cylinder firing events of one or more selected cylinders. For example, a single representative cylinder may be selected. Alternately, representative cylinders for each bank in a V-type engine may be selected.

According to the present example, the counter module 114 determines a number of engine cycles since the last SPI process ended by counting a number of rotations of the crankshaft 44. The counter module 114 receives the CP signal 104 from the CP sensor 86 and a counter reset signal 136 from the SPI process initiation module 122. The counter reset signal 136 informs the counter module 114 when an SPI process has ended. In various implementations, the counter reset signal 136 may further inform the counter module 114 when the SPI process begins. The counter reset signal 136 may provide information on a cylinder-by-cylinder basis. The counter module 114 determines or counts the number of engine cycles since the last SPI process has ended based on the signals received. The counter module 114 outputs a current engine cycle count since the last SPI process in the counter signal 134.

In various implementations, the counter module 114 may count only the number of engine cycles within a specific engine speed and load range. Alternately or additionally, the counter module may exclude a number of engine cycles occurring within other engine speed and load ranges from the count. The counter module 114 may also employ a weighting filter that emphasizes a count of engine cycles occurring within engine speed and load ranges where SPI is more likely to occur. The weighting filter may suppress another count of engine cycles within engine speed and load ranges where SPI is less likely to occur.

The spark limit module 116 periodically determines a spark-knock limit and outputs a spark limit signal 138 indicative of a current spark-knock limit. Generally, the spark-knock limit is a threshold amount of spark advance beyond which spark-knock is likely to occur under the current engine operating conditions. Generally, an amount of spark advance is controlled so as to not exceed the spark-knock limit. In this way, an occurrence of spark-knock can be avoided. Generally, an occurrence of spark-knock depends on engine design and operating conditions which influence end-gas temperature, cylinder pressures, and a period spent at high end-gas temperatures and cylinder pressures prior to the arrival of the flame front at the end gases. The spark-knock limit may be determined according to various methods based on one or more engine operating parameters including, but not limited to, engine speed, engine torque, engine temperature, and intake and exhaust valve phasing. In closed-loop systems, a knock sensor may detect whether spark knock is occurring and spark timing may be adjusted based on the spark-knock limit and feedback from the knock sensor. According to the present example, the spark limit module 116 determines the spark-knock limit based on engine speed and engine torque. The spark limit module 116 receives the engine speed signal 130 and the engine torque signal 132 and determines the current spark-knock limit based on the signals received.

The boost estimation module 118 determines an amount of boost provided by the compressor 62, or boost pressure, and outputs a boost pressure signal 140 indicative of a current boost pressure. Generally, boost pressure is a measure of an amount of the increase in pressure provided by the compressor 62, or difference between a pressure of the compressed air charge provided by the compressor 62 and the ambient pressure of the air available to the ICE 32. The boost pressure may be determined according to various methods based on one or more engine operating parameters including, but not limited to, MAP, engine speed, exhaust flow rate, and waste gate position. According to the present example, the boost estimation module 118 determines the boost pressure based on MAP. The boost estimation module 118 receives the MAP signal 102 and determines the current MAP based on the signal received.

The SPI detection module 120 detects SPI events and outputs a SPI detection signal 142 indicating when an SPI event is detected. The SPI detection module 120 further determines the cylinder in which an SPI event has occurred and outputs the identity of the cylinder in the SPI detection signal 142. SPI events may be detected according to various methods. According to one method, SPI events can be detected by monitoring perturbations or irregular variations in engine speed and/or exhaust oxygen content. According to the present example, the SPI detection module 120 detects SPI events based on engine speed and oxygen content. The SPI detection module 120 receives the CP signal 104 and the O2 signal 106 and outputs the SPI detection signal 142 based on the signals received.

The SPI process initiation module 122 selectively initiates one of a preventative SPI process and a reactive SPI process according to the present disclosure based on various inputs. The SPI process initiation module 122 initiates the SPI process by outputting SPI process requests in an SPI process request signal 144. The SPI process requests specify which SPI process to execute, either the preventative SPI process or the reactive SPI process.

The SPI process initiation module 122 outputs a reactive SPI process request when an SPI event has been detected. The SPI process initiation module 122 outputs a preventative SPI process request when a period since the last SPI process was executed is greater than a predetermined SPI control period and predetermined enablement criteria are met. Generally, the SPI control period is a period that ensures fuel-oil mixtures that may be accumulating on the combustion chamber walls and crevices will not reach a level at which SPI is likely to occur. The SPI control period takes into account the particular counting method employed by the counter module 114 and may be a function of the engine speed and load range at which the engine cycle count was accrued and/or the weighting that was employed. Suitable SPI control periods can be predetermined during an engine development or calibration phase based on engine testing. The SPI control period may be in engine cycles or cylinder firing events. For example only, a suitable SPI control period may be around one thousand (1000) engine cycles. According to the present example, the SPI control period is a predetermined counter value corresponding to a number of engine cycles.

Generally, the enablement criteria specify one or more engine operating conditions under which SPI would typically occur and spark-knock can be initiated in a controlled manner by advancing spark timing. The enablement criteria can be predetermined during an engine development or calibration phase based on engine testing. According to the present example, the enablement criteria include a predetermined engine speed range and a boost pressure threshold. The boost pressure threshold may be a function of one or more engine operating parameters including, but not limited to, engine speed. According to the present example, the boost pressure threshold is a predetermined linear function of engine speed. Together, the engine speed range and the boost pressure threshold define an engine operating region in which SPI would typically occur. This engine operating region generally will be smaller than the engine operating region in which spark-knock can be initiated. The enablement criteria are met when the engine speed is within the engine speed range and the boost pressure is greater than the boost pressure threshold. Instead of, or in addition to a boost pressure threshold, the enablement criteria may specify a predetermined engine torque threshold or range. In this case, the enablement criteria are met when the engine torque is greater than the engine torque threshold, or within the engine torque range. The engine torque threshold or range may be a function of one or more engine operating parameters.

According to the present example, the SPI process initiation module 122 receives the engine speed signal 130, the counter signal 134, the boost pressure signal 140, and the SPI detection signal 142 and outputs the SPI process request signal 144 based on the signals received. The SPI process initiation module 122 monitors the SPI detection signal 142 and outputs a reactive SPI process request when an SPI event is detected. The SPI process initiation module 122 monitors the counter signal 134 and determines when the current engine cycle count is greater than the counter value. The SPI process initiation module 122 further monitors the engine speed signal 130 and the boost pressure signal 140. The SPI process initiation module 122 periodically determines a boost pressure threshold based on the current engine speed. The boost pressure threshold may be determined from an equation stored in memory and/or memory table. The SPI process initiation module 122 determines when the current engine speed is within the engine speed range and the current boost pressure is greater than the current boost pressure threshold. The SPI process initiation module 122 outputs a preventative SPI process request when the enablement conditions are met.

The spark module 124 controls spark timing by outputting a spark control signal 146 to the ignition system 54. The fuel module 126 controls fueling and, more particularly fuel-air equivalency ratio, by outputting a fuel control signal 148 to the fuel system 52. The spark module 124 communicates with the fuel module 126, and together the spark module 124 and the fuel module 126 selectively execute the preventative SPI process and the reactive SPI process in each of the cylinders 40. The SPI processes may be executed in one or more of the cylinders 40 at the same time and may be executed one cylinder at a time (i.e., cylinder-by-cylinder), in cylinder pairs, bank-by-bank, or other suitable combination of the cylinders 40. The SPI processes may be executed according to a firing order, a predetermined sequence, as an SPI process is completed in each cylinder (i.e., on a rotating basis), or other suitable order. The number and order of executing the SPI processes in the cylinders 40 can be predetermined to avoid objectionable engine vibration and noise, or an objectionable reduction in engine performance.

According to the present example, the preventative SPI processes are executed cylinder-by-cylinder on a rotating basis. Each preventative SPI process begins with a next cylinder to fire after the respective SPI process request is received and proceeds with a next remaining cylinder to fire after the SPI process ends for the preceding cylinder. The spark module 124 receives the SPI process request signal 144 and the spark limit signal 138. In response to a preventative SPI request, the spark module 124 begins a first period of a preventative SPI process in a first cylinder, which is a next cylinder to fire after the request is received. The spark module 124 advances the spark timing in the first cylinder a predetermined number (R) degrees past the current spark limit for a predetermined number (N) consecutive cylinder firing events. The number R may be a real number greater than zero and, generally, will be a number of degrees sufficient to cause spark-knock. For example only, R may be between around zero degrees and ten degrees and, more particularly, between around two degrees and ten degrees, including all sub ranges. The number N may be an integer number greater than zero and, generally, will be a number of cylinder firing events sufficient to dislodge any fuel-oil deposits within a cylinder. For example only, N may be between around one and three, including all sub ranges. More particularly, N may be equal to one.

At an end of the first period, or end of the Nth cylinder firing event, the fuel module 126 begins a second period of the preventative SPI process in the first cylinder. The fuel module 126 supplies a rich fuel-air charge to the first cylinder for each of a next M consecutive cylinder firing events of the first cylinder, M being an integer greater than zero. During each of the M consecutive cylinder firing events, the spark module 124 retards the spark timing of the first cylinder past the current spark limit to remove the additional spark advance that was added to induce spark-knock. The rich fuel-air charge may be supplied so as to have a predetermined fuel-air equivalence ratio. Alternately, the rich fuel-air charge may be supplied to have a fuel-air equivalence ratio that is a predetermined control amount greater than a fuel-air equivalence ratio of a last fuel-air charge supplied to the first cylinder during the first period. Generally, the rich fuel-air charge will have an equivalence ratio that provides sufficient cooling to suppress pre-ignition of any dislodged fuel-oil deposits while avoiding other objectionable effects, such as an objectionable amount of exhaust smoke. Additionally, the rich fuel-air charge will have an equivalence ratio greater than a nominal fuel-air equivalence ratio during other periods, which may be between around one point zero (1.0) and one point two (1.2). For example only, the fuel-air equivalence ratio during the second period may be between around one point zero (1.0) and one point five (1.5) and, more particularly, between around one point two (1.2) and one point four (1.4), including all sub ranges. As used herein, fuel-equivalence ratio is a ratio of a fuel-to-air ratio to a stoichiometric fuel-to-air ratio. Thus, rich fuel mixtures have fuel-air equivalence ratios greater than one, while lean fuel mixtures have fuel-air equivalence ratios less than one. Generally, the number M will be a suitable number of cylinder firing events sufficient to allow any dislodged fuel-oil deposits to be cleared from the cylinder during the second period. For example only, the number M may be between one and twenty cylinder firing events and, more particularly, may be between two and ten cylinder firing events, including all sub ranges.

The preventative SPI process of the first cylinder ends at an end of the second period, or end of the Mth cylinder firing event. After executing the preventative SPI process on the first cylinder, a preventative SPI process is sequentially completed on the remaining cylinders in substantially the same manner as that described above for the first cylinder. Various control parameters such as the number R degrees, the numbers N and M consecutive cylinder firing events, and the fuel-air equivalence ratio during the second period can vary between the cylinders. For example, the control parameters may vary based on the operating conditions at a time when the processes are executed. In various implementations, a delay may be scheduled between preventative SPI processes of the remaining cylinders to control the effect on engine noise, vibration, and torque output. For example, where the SPI control period is one thousand cycles and the engine is a four cylinder engine such as in the present example, a preventative SPI process may be completed on a different cylinder every two hundred fifty (250) cycles.

In response to a reactive SPI request, the fuel module 126 begins a reactive SPI process in the cylinder in which an SPI event was detected. The fuel module 126 supplies a rich fuel-air charge to that cylinder for a next P consecutive cylinder firing events, P being an integer greater than zero. The rich fuel-air charge may be supplied so as to have a predetermined equivalence ratio. Alternately, the rich fuel-air charge may be supplied to have a fuel-air equivalence ratio that is a predetermined control amount greater than a fuel-air equivalence ratio of a last fuel-air charge supplied to the first cylinder. Generally, the rich fuel-air charge will have an equivalence ratio that provides sufficient cooling to suppress pre-ignition of any fuel-oil deposits dislodged during the detected SPI event while avoiding other objectionable effects. Accordingly, the fuel-air equivalency ratio during the reactive SPI process may be substantially similar to that during the preventative SPI process. Similarly, the number P may be substantially similar to the number M.

Figure 4:
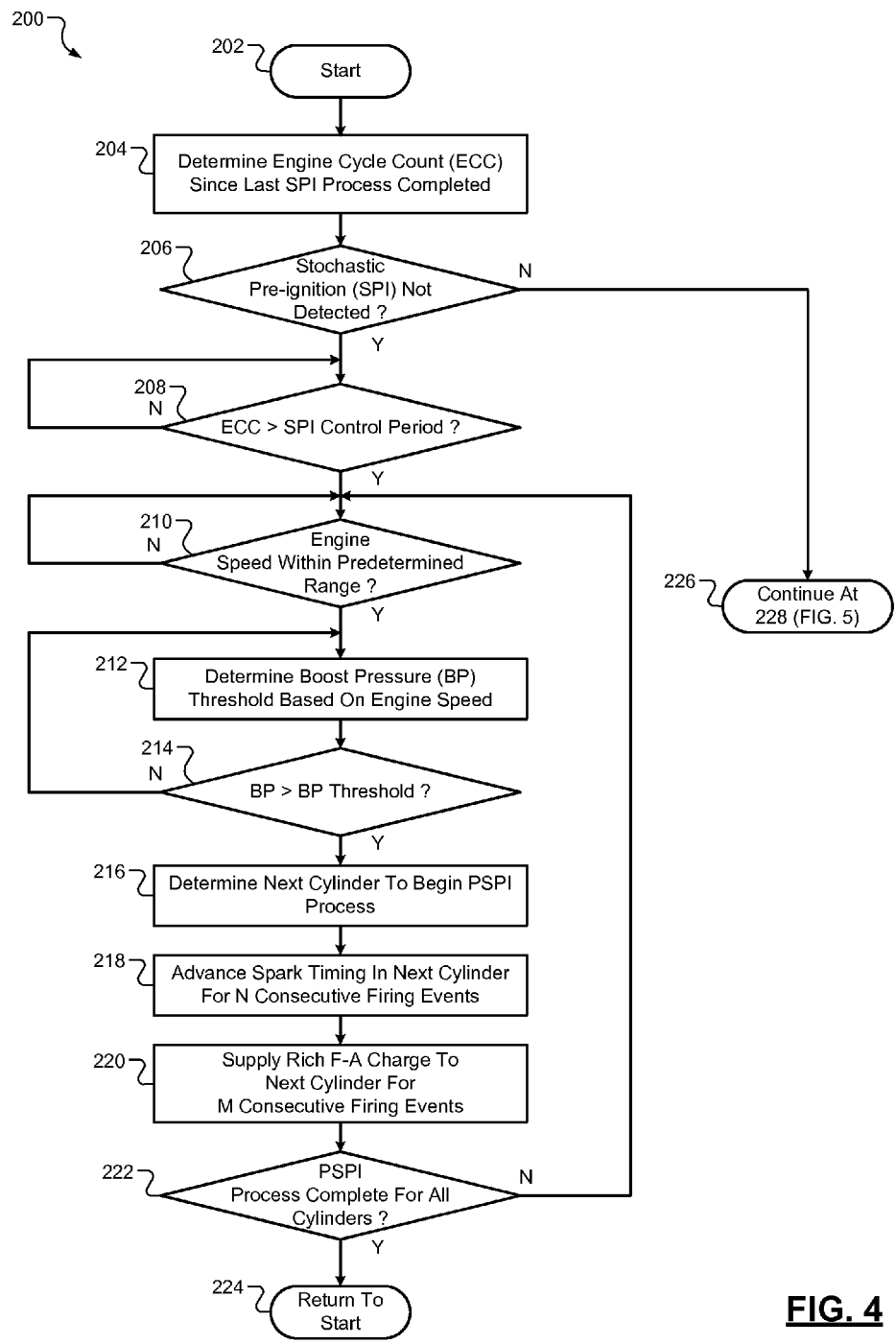
FIGS. 4-5 are flow diagrams illustrating an exemplary method for controlling stochastic pre-ignition in an engine according to the present disclosure.
Figure 5:
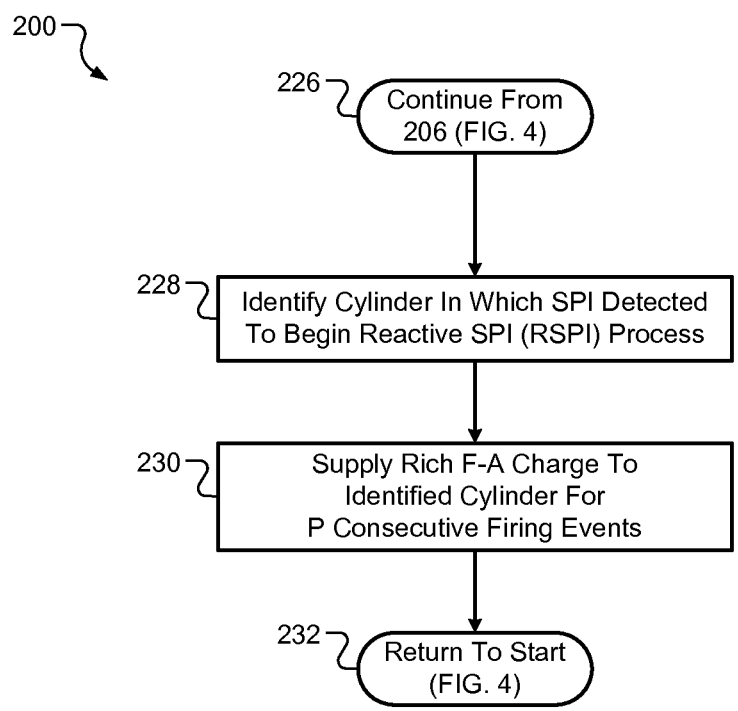

With particular reference to FIGS. 4-5, flow diagrams illustrate an exemplary method 200 for controlling an engine and, more particularly, controlling SPI in an engine according to the present disclosure. The method 200 can be executed in a periodic manner during operation of an engine. The method 200 can be implemented in one or more modules of an engine control system such as the engine control system 30 for controlling SPI in an engine such as the ICE 32. Accordingly, the method 200 will be described with reference to the engine control system 30 described above. In this way, operation of the engine control system 30 and, more particularly, the pre-ignition module 109 can be more fully described and understood.

A start of the method 200 is designated at 202. Control proceeds at 204 where the counter module 114 periodically determines a current engine cycle count. Control proceeds at 206 where the SPI detection module 120 periodically detects whether an SPI event has occurred. If an SPI event is not detected, control proceeds at 208. If an SPI event is detected, the SPI process initiation module 122 outputs a request to execute a reactive SPI process and control proceeds at 228 (FIG. 5) as designated at 226. At 208, the SPI process initiation module 122 determines whether the current engine cycle count is greater than the predetermined SPI control period. If yes, then control proceeds at 210-214 where the SPI process initiation module 122 determines whether the SPI enablement criteria are met, otherwise control loops back as shown.

At 210, the SPI process initiation module 122 determines whether the current engine speed is within the predetermined engine speed range. If yes, then control proceeds at 212, otherwise, control loops back as shown. At 212, the SPI process initiation module determines the boost pressure threshold based on the current engine speed. At 214, the SPI process initiation module 122 determines whether the current boost pressure is greater than the boost pressure threshold. If yes, then the SPI process initiation module outputs a request to execute a preventative SPI process and control proceeds at 216, otherwise, control loops back as shown.

At 216, the spark module 124, in response to the preventative SPI process request made at 214 determines a next cylinder to fire as the next cylinder to begin the preventative SPI process. Control proceeds at 218 where the spark module 124 advances the spark timing in the cylinder determined at 216 the predetermined number R degrees past the current spark limit for the predetermined number N consecutive cylinder firing events. At 220, the fuel module 126 supplies a rich fuel-air charge to cylinder determined at 216 for the next M consecutive cylinder firing events after the Nth cylinder firing event. At 222, the spark module 124 determines whether the preventative SPI process has been completed for all of the cylinders 40. If yes, then control returns to the start at 202. The return to start is designated at 224.

Referring now to FIG. 5, control proceeds at 228 when an SPI event is detected at 206. At 228, the SPI detection module 120 identifies the cylinder in which the SPI event was detected. Control proceeds at 230 where the fuel module 126 supplies a rich fuel-air charge to the cylinder identified at 228 for the next P consecutive cylinder firing events. After the Pth cylinder firing event, control returns to the start at 202. The return to start is designated at 232.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:
1. A control system for an engine, comprising:
an initiation module that selectively initiates a stochastic pre-ignition (SPI) process to induce SPI and that generates a request signal indicating initiation of the SPI process to induce SPI;

a spark module that, in response to receiving the request signal indicating the initiation of the SPI process to induce SPI, advances spark timing of a cylinder R degrees past a spark limit for N consecutive cylinder firing events, and retards spark timing of said cylinder past said spark limit for M consecutive cylinder firing events after said N consecutive cylinder firing events; and a fuel module that supplies, in response to receiving the request signal indicating the initiation of the SPI process to induce SRI, a rich fuel-air charge to said cylinder for said M consecutive cylinder firing events, wherein R is a real number greater than zero, N and M are integers greater than zero, and said spark limit is a control value used to limit an amount of spark advance to prevent spark-knock.

2. The control system of claim 1, wherein the initiation module determines when an engine speed is within a predetermined range, and wherein said spark module advances spark timing for a first one of said N consecutive cylinder firing events when said engine speed is within said predetermined range.

3. The control system of claim 1, wherein:
the initiation module determines when at least one of the following criteria is met:
(i) an engine torque is within a predetermined first range; and
(ii) a boost pressure is within a predetermined second range,
wherein said spark module advances spark timing for a first one of said N consecutive cylinder firing events when said at least one of said criteria is met.

4. The control system of claim 1, further comprising a detection module that detects when an SPI event occurs in said cylinder, and wherein said fuel module supplies a rich fuel-air charge to said cylinder for P consecutive cylinder firing events when said SPI event is detected, P being an integer greater than zero.

5. The control system of claim 1, wherein said M consecutive cylinder firing events begin on a next cylinder firing event of said cylinder after said N consecutive cylinder firing events.

6. The control system of claim 1, wherein, for each of a plurality of remaining cylinders, one cylinder at a time:
said spark module advances spark timing R degrees past said spark limit for another N consecutive cylinder firing events; and
said fuel module supplies another rich fuel-air charge for another M consecutive cylinder firing events after said N consecutive cylinder firing events.

7. The control system of claim 1, wherein a fuel-air equivalence ratio of said fuel-air charge is greater than 1.0 and less than 1.5.

8. The control system of claim 1, wherein N is an integer greater than zero and less than three.

9. The control system of claim 1, wherein M is an integer greater than zero and less than twenty.

10. The control system of claim 1, wherein said engine is one of a turbocharged engine and a supercharged engine.

11. A method for controlling an engine, comprising:
selectively initiating a stochastic pre-ignition (SPI) process to induce SPI;
generating a request signal indicating initiation of the SPI process to induce SPI;
in response to the request signal indicating the initiation of the SPI process to induce SPI, advancing spark timing of a cylinder R degrees past a spark limit for N consecutive cylinder firing events and retarding spark timing of said cylinder past said spark limit for M consecutive cylinder firing events after said N consecutive cylinder firing events; and
in response to the request signal indicating the initiation of the SPI process to induce SPI, supplying a rich fuel-air charge to said cylinder for said M consecutive cylinder firing events,
wherein R is a real number greater than zero, N and M are integers greater than zero, and said spark limit is a control value used to limit an amount of spark advance to prevent spark-knock.

12. The method of claim 11, further comprising:
determining when an engine speed is within a predetermined range; and
advancing spark timing of said cylinder for a first one of said N consecutive cylinder firing events when said engine speed is within said predetermined range.

13. The method of claim 11, further comprising:
determining when at least one of the following criteria is met:
(i) an engine torque is within a predetermined first range, and
(ii) a boost pressure is within a predetermined second range; and
advancing spark timing of said cylinder for a first one of said N consecutive cylinder firing events when said at least one of said criteria is met.

14. The method of claim 11, further comprising:
detecting when an SPI event occurs in said cylinder; and
supplying a rich fuel-air charge to said cylinder for P consecutive cylinder firing events when said SPI event is detected, P being an integer greater than zero.

15. The method of claim 11, wherein said M consecutive cylinder firing events begin on a next cylinder firing event of said cylinder after said N consecutive cylinder firing events.

16. The method of claim 11, further comprising:
advancing spark timing R degrees past said spark limit for another N consecutive cylinder firing events for each of a plurality of remaining cylinders, one cylinder at a time; and
supplying another rich fuel-air charge for another M consecutive cylinder firing events after said N consecutive cylinder firing events for each of said plurality of remaining cylinders, one cylinder at a time.

17. The method of claim 11, wherein a fuel-air equivalence ratio of said fuel-air charge is greater than 1.0 and less than 1.5.

18. The method of claim 11, wherein N is an integer greater than zero and less than three.

19. The method of claim 11, wherein M is an integer greater than zero and less than twenty.

20. The method of claim 11, wherein said engine is one of a turbocharged engine and a supercharged engine.

* * * * *

UNITED STATES PATENT AND TRADEMARK OFFICE
CERTIFICATE OF CORRECTION

PATENT NO. : 9,127,604 B2  
APPLICATION NO. : 13/215826  
DATED : September 8, 2015  
INVENTOR(S) : Davis Page 1 of 1

It is certified that error appears in the above-identified patent and that said Letters Patent is hereby corrected as shown below:

<u>Title Page</u>, Item [73] insert
--GM Global Technology Operations LLC, Detroit, MI (US)--

Signed and Sealed this  
Twenty-fourth Day of May, 2016

Michelle K. Lee  
*Director of the United States Patent and Trademark Office*